Figure 1:
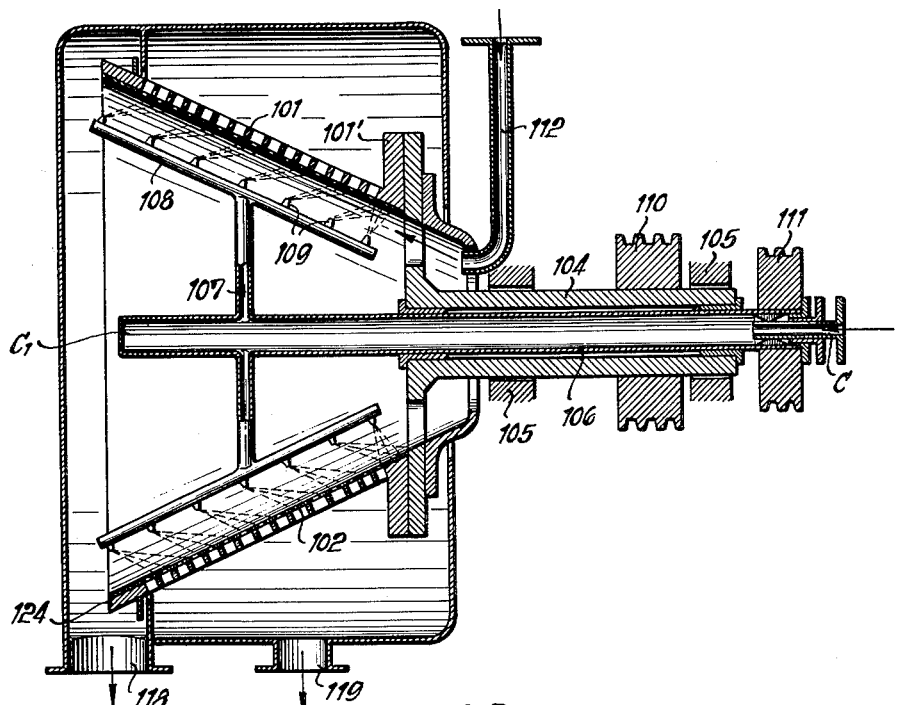

Jan. 30, 1962

L. SCHMIEDEL 3,018,895

DEVICE FOR FLOATING UP AND WASHING OUT
OF GROUND PRODUCTS OR MATERIALS

Filed Dec. 28, 1955

5 Sheets-Sheet 1

INVENTOR
LUDWIG SCHMIEDEL

By Watson, Cole, Grindle + Watson
ATTORNEYS

Jan. 30, 1962     L. SCHMIEDEL     3,018,895
DEVICE FOR FLOATING UP AND WASHING OUT
OF GROUND PRODUCTS OR MATERIALS
Filed Dec. 28, 1955     5 Sheets-Sheet 2
FIG. 3
FIG. 6
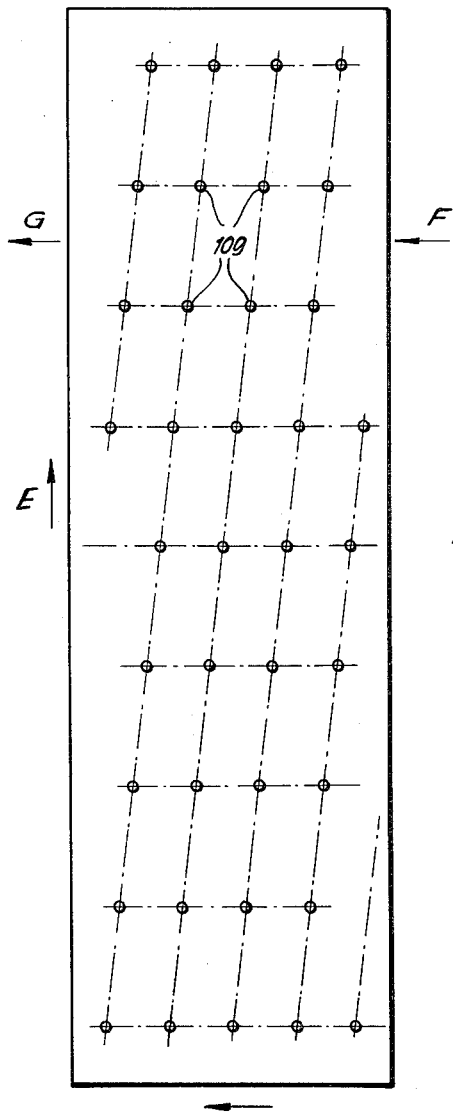
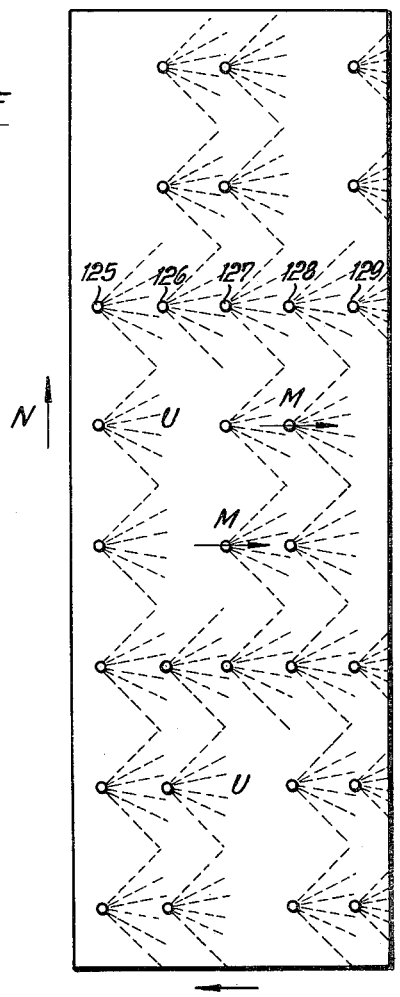
INVENTOR
LUDWIG SCHMIEDEL
By Watson, Cole, Grindle & Watson
ATTORNEYS

INVENTOR
LUDWIG SCHMIEDEL

Jan. 30, 1962 L. SCHMIEDEL 3,018,895
DEVICE FOR FLOATING UP AND WASHING OUT
OF GROUND PRODUCTS OR MATERIALS
Filed Dec. 28, 1955 5 Sheets-Sheet 5
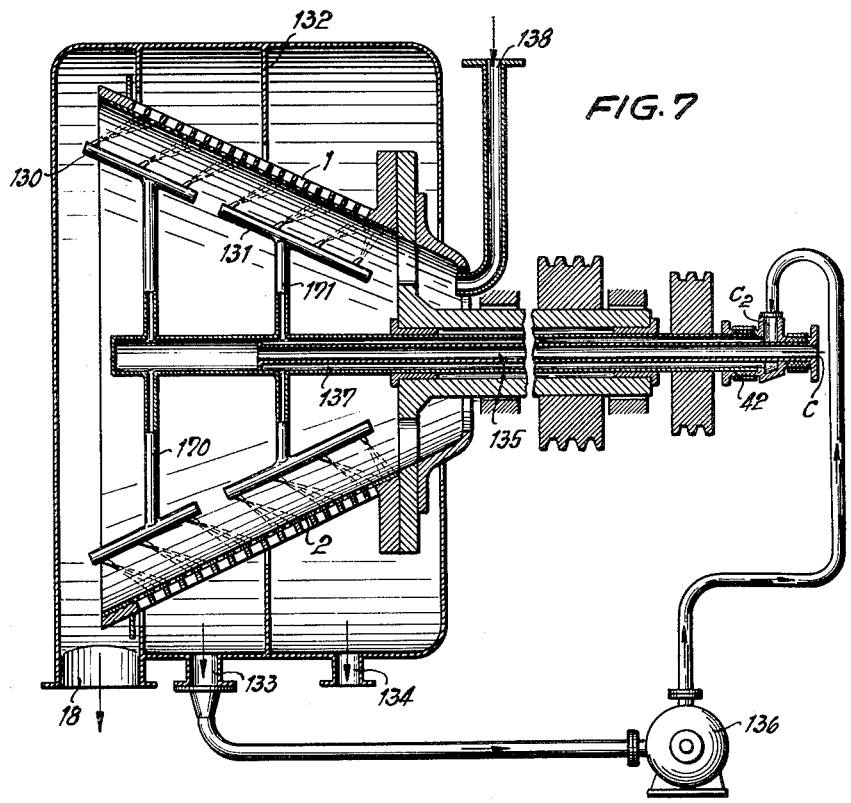
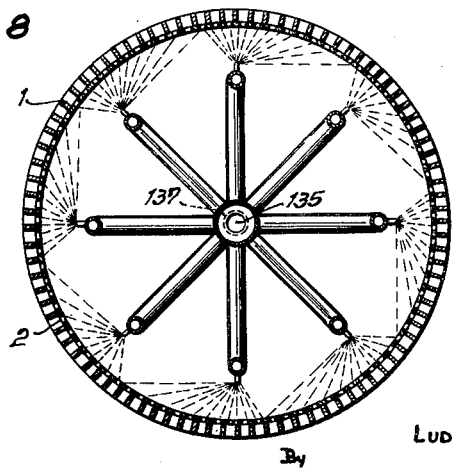
INVENTOR
LUDWIG SCHMIEDEL
By
Watson, Cole, Grindle & Watson
ATTORNEYS

United States Patent Office

3,018,895
Patented Jan. 30, 1962

3,018,895
DEVICE FOR FLOATING UP AND WASHING OUT OF GROUND PRODUCTS OR MATERIALS
Ludwig Schmiedel, Wunstorf-Hannover, Germany, assignor to Starcosa Machinen- und Apparatebau G.m.b.H., Wunstorf-Hannover, Germany, a firm
Filed Dec. 28, 1955, Ser. No. 555,962
3 Claims. (Cl. 210—374)

The invention relates to a device for floating up and washing out of ground products or materials.

The machine described in my main application shows in the interior of a cylindrical or slight conical centrifugal drum a device provided with nozzles adapted to cast rays of water on the said drum. This device is adapted to rotate with respect to the drum with a relative number of revolutions. In view of the inclined jets of water, it is true, a repeated floating up and consequently an efficacious washing out of the raw material is attained, however, as the jets of water must bring about also the feed of the material through the drum the required amounts of water with respect to the amount of material are great, which is not desirable for certain kinds of material.

It is an object of the invention to overcome this drawback. According to the invention the washing out takes place in a strong conical drum, in which the run of the material is effected under the influence of the centrifugal force. Herewith, the nozzles of fluid adapted to revolve with a distinct number of revolutions are arranged in such a manner that they counteract to the movement of the material and float it and wash it out thoroughly only during a single run through the machine. With such a construction of the screen-drum and with an automatic run or flow of the ground material substantially less water is required for its floating up and washing out than as in the construction of the main application, in which the water conveyed by the nozzles besides its floating up and washing out effect has to bring about the conveyance or transportation of the material through the drum. In any case the water pressure for the nozzles can be controlled during the operation in such a manner that the desired floating action takes place. The nozzles are hereby arranged in form of a screw, the direction of feed of which may be either in the same direction or in the opposite direction to the run of the materials. In this case, however, the checking or locking effect of the water screw with respect to the run of the material is not a perfect one. The ground material, it is true, is floated up by the water screw, however, is adapted to penetrate the turns of the said screw.

Therefore, a further object of the invention is to increase this checking or locking effect and this is accomplished by directing the conveyance of the water screw opposite to the run of the material. This increased checking effect is particularly advantageous for the washing out of lightly flowing ground materials.

A further object of the invention is to arrange the nozzles in such a manner that they form a plurality of water discs, each of which having a gap or an interruption, in which no jet of nozzle exists. Preferably these gaps are staggered in the several water discs. On a very strong floating action and if a very strong checking action of the material takes place the said material is adapted to move through the cuts or gaps in which no nozzles are present to the outlet.

The direction of the nozzles and therefore the direction of the jets of water should be accommodated to the ground material, i.e. the nozzles should be adjustable. Changes in the said adjustment can be made during the stopping of the machine.

The invention in its preferred form or approximately such form is illustrated in the accompanying drawings, wherein like characters indicate like parts throughout the several views.

Figure 2:
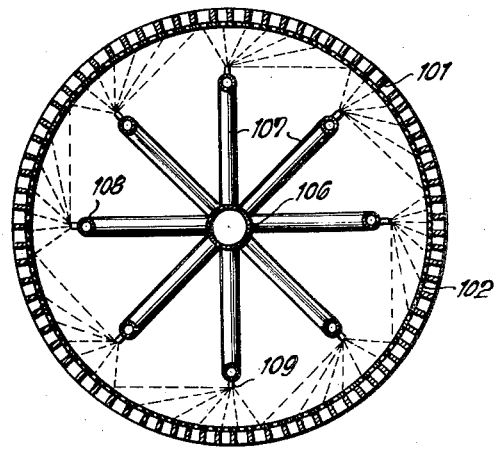

FIG. 1 is a longitudinal section through the machine according to the invention, FIG. 2 shows a cross section through the screen drum, FIG. 3 shows a development of the screen insert, the inside face at the top, in which the nozzles are arranged in form of a double threaded screw of distinct pitch.

Figure 4:
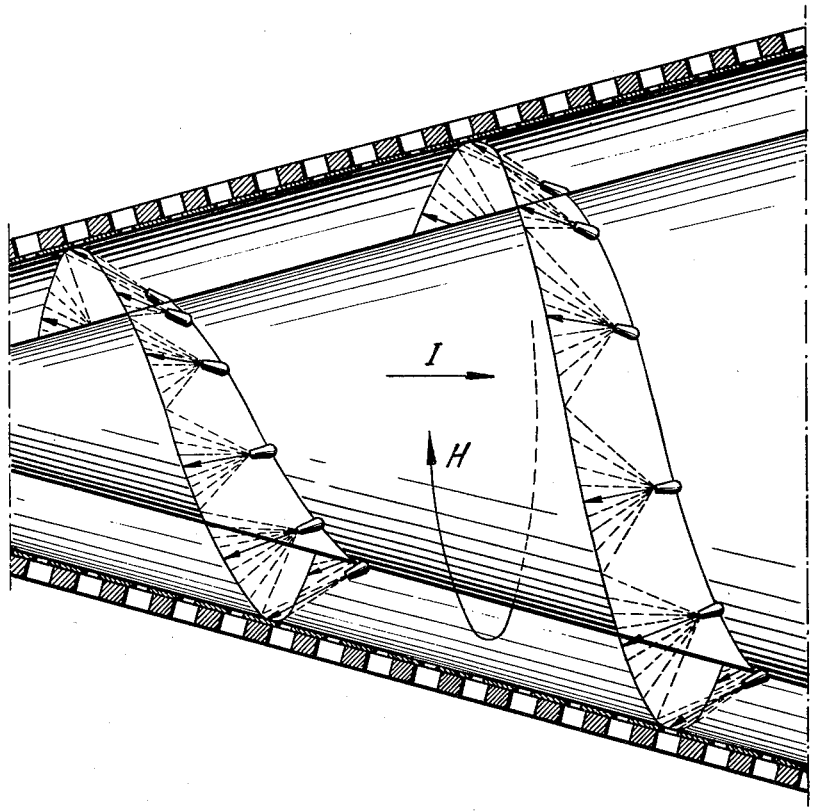
Figure 5:
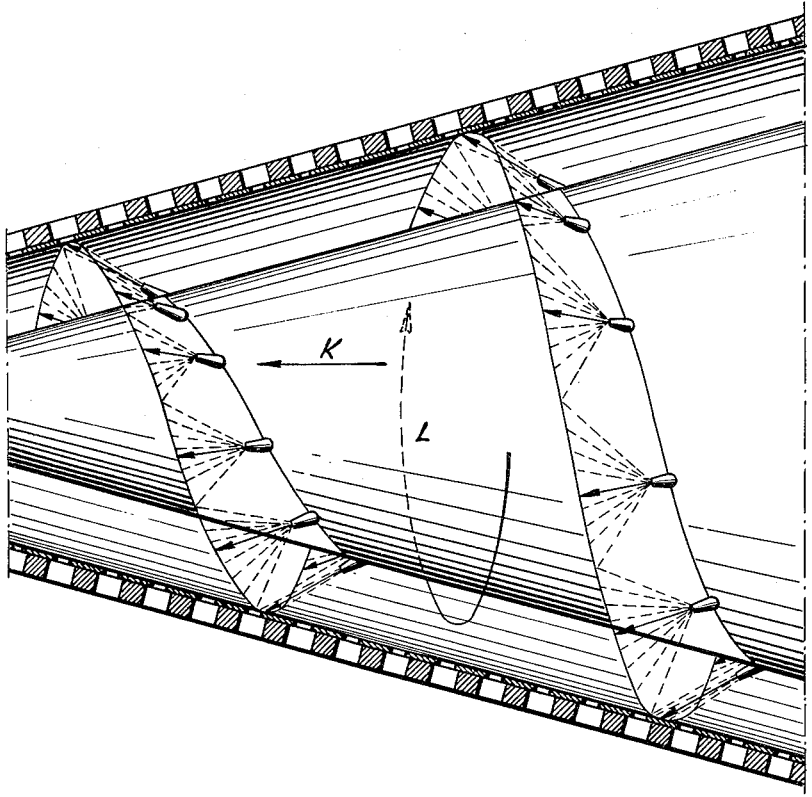
Figure 9:
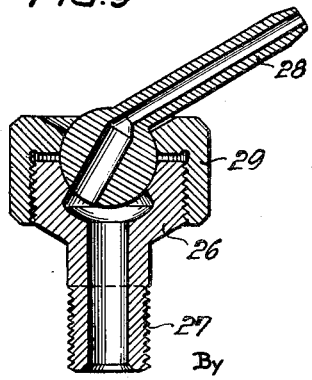

FIG. 4 shows an arrangement of the nozzles according to a single-threaded screw and in which the direction of feed is parallel and in the same direction of the run of material through the drum, FIG. 5 shows an arrangement, in which the feed of the screw is oppositely directed to the direction of run of the material, FIG. 6 shows a development of the screen insert, in which the jet of the nozzles has the form of a disc, FIGS. 7 and 8 show in a longitudinal section and in an elevation a machine with a drum of a strong conical shape, and FIG. 9 is a section of an adjustable nozzle.

As shown in FIG. 1 of the drawings the washer comprises a rotary, perforated weak conical drum 101 covered on the inside with a screening plate 102. This drum is connected by means of a flange 101' directly with a hollow shaft 104 mounted in bearings 105. Rotatably mounted in the said hollow shaft 104 is a tube 106 which is rotated with a slight relative number of rotations with respect to the drum and which is provided with cross tubes 107 and inclined tubes 108 provided with nozzles 109.

Water under pressure enters at C into the tube 106 for the nozzles. If desired, the said water may be fed on the opposite end of the tube 106 at $C^1$. For driving the hollow shaft 104 and the tube 106. V-belt pulleys 110, 111 are provided. The ground product enters into the machine through the inlet tube 112 and after passing the machine over the screening plate of the conical drum it leaves the drum at 124 and arrives at the tail race 118.

The washing fluid containing e.g. the washed out starch flows outwards through the screen 102 and leaves the machine at 119 as shown in FIG. 1 of the drawings. The nozzles 109 are arranged with respect to the inside of the drum according to a distinct system. In the example shown in FIG. 3 the nozzles are arranged in the form of a double-threaded screw. These nozzles which are preferably constructed as flat jet-nozzles are so arranged that the widths of the jets of fluid of two adjacent nozzles are overlapping, whereby a closed jet of fluid in the form of a worm band is formed. This jet of fluid is of a size that the ground product in flowing through the apparatus is checked or locked.

Therefore, the ground product is getting blocked in front of the nozzles. In view of the arrangement of the jets of fluid in form of a worm or screw the ground product can flow in consequence of the relative movement of the water jets with respect to the screen according to the arrow E in FIG. 3 from the inlet (arrow F) to the outlet (arrow G) through the drum.

The relative direction of rotation of the water screw with respect to the screen drum (direction of the arrow H in FIG. 4) is so selected that the direction of feed of the said water screw (compare arrow I) is equal to the direction of flow of the ground product through the conical drum.

In operation and especially in washing out of light flowing ground products it has shown that the checking effect and therefore also the washing out effect is materially improved, when the way of feed of the screw does not take place in the direction of the flow of the ground product through the drum, but oppositely thereto, as shown in FIG. 5 of the drawings. In such a case the jets of water as well as the direction of feed of the screw are counteracting against the flow of the product as it is indicated by the arrow K in FIG. 5 of the drawings.

The relative direction of rotation of the water screw with respect to the drum takes place in this case according to the arrow L in FIG. 5, so that an increased checking or locking effect of the ground product occurs in front of the water screw and therefore also an increased washing-out effect.

Another arrangement of the nozzles is shown in FIG. 6 of the drawings. In this modification the nozzles jets form discs of water and in the example shown five discs 125, 126, 127, 128 and 129, in each of which gaps U are provided so that at said places no nozzles exist. The arrows M demonstrate the direction of the water jets in front of which the material is checked.

In consequence of the relative movement of the nozzles with respect to the face of the screen according to the arrow N in FIG. 6 of the drawings the ground product is adapted to enter through the particular gaps U in the water discs and can arrive at the outlet.

In FIGS. 7 and 8 of the drawings the drum of the washer has a strong truncated form, in which the ground product is fed automatically under the influence of the centrifugal force from the inlet to the outlet of the device. The supply of the water to the nozzles is, however, divided into two sections 130 and 131. The casing for the lactic starch produced by the washing operation is divided by a division wall 132 into two compartments, each of which being provided with an outlet opening 133 and 134 respectively.

The water is supplied at C and arrives through the tube 135 to the set of nozzles 130 which casts rays of water on that part of the screen drum lying against the outlet. The starching milk produced flows out at 133 from the casing and is conveyed by means of a pump 136 via the tube C² and the circular space 137 to the set of nozzles 131. The ground product supplied at 138 after entering into the screen drum is sprinkled with water by the nozzles 131 whereby the chief amount of the starch is washed out. When the ground product has passed the jets of water 131 only a small content of starch exists in the product, which is now fully washed out by the water from the nozzles 30.

By this way a very good washing out is effected only with a small amount of water.

In FIG. 9 of the drawings an adjustable nozzle is shown in which the basement 26 is provided with screw threads 27 on its under end and carries a nozzle 28, the under end of which is formed as a ball which fits into the ball-shaped seat of the basement. A cap nut 29 provided with a ball-shaped recess is screwed upon the thread of the basement in order to hold the nozzle in its adjusted position.

It will be understood that I do not limit myself to the details of construction above set forth, but on the contrary, that many modifications may be made within the broad scope of my invention.

What I claim and desire to secure by Letters Patent of the United States is as follows:

1. An apparatus for washing ground material, especially disintegrated raw material for the production of starch comprising a casing, a conical centrifugal screening member mounted for rotation in said casing, means for supplying the material to be washed to one end of said member and receiving the material as it is discharged from the other end of the member, said material being rotated with the member and advanced lengthwise therethrough by centrifugal force, a nozzle carrier mounted in the interior of said member for differential rotation relative thereto, a plurality of nozzles arranged in the form of a screw on said carrier each nozzle being directed upstream of the normal direction of movement of the material, and means for supplying water under pressure to said nozzles.

2. An apparatus for washing ground material, especially disintegrated raw material for the production of starch comprising a casing, a conical centrifugal screening member mounted for rotation in said casing, means for supplying the material to be washed to one end of said member and receiving the material as it is discharged from the other end of the member, said material being rotated with the conical member and advanced lengthwise therethrough by centrifugal force, a nozzle carrier mounted in the interior of said member for differential rotation relative thereto, a plurality of nozzles arranged in the form of a double threaded screw on said carrier each nozzle being directed upstream of the normal direction of movement of the material, and means for supplying water under pressure to said nozzles.

3. A machine for washing ground material, especially disintegrated raw material for the production of starch comprising a casing, a conical centrifugal screening member mounted for rotation in said casing, means for supplying the material to be washed to one end of said member and receiving the material as it is discharged from the other end of the member, said material being rotated with the member and advanced lengthwise therethrough by centrifugal force, a nozzle carrier mounted in the interior of said member for differential rotation relative thereto, a plurality of nozzles arranged helically on the carrier in such a way that the screw of jets ejected from the nozzles counteract the advancing movement of the material by the centrifugal force, thus checking the material, each nozzle being obliquely directed upstream to the advancing movement of the material thereby checking and floating it.

References Cited in the file of this patent

UNITED STATES PATENTS

| | | |
|---|---|---|
| 136,485 | Burchardt | Mar. 4, 1873 |
| 518,152 | Lach | Apr. 10, 1894 |
| 568,821 | Waring | Oct. 6, 1896 |
| 706,441 | McLaughlin | Aug. 5, 1902 |
| 1,461,909 | Jandos | July 17, 1923 |
| 1,565,002 | Behr | Dec. 8, 1925 |
| 1,749,368 | Behr | Mar. 4, 1930 |
| 1,843,697 | Roberts | Feb. 2, 1932 |
| 1,936,413 | Stillson | Nov. 21, 1933 |
| 1,989,728 | Zorn | Feb. 5, 1935 |
| 2,037,840 | Weston | Apr. 21, 1936 |
| 2,096,594 | Sanchez | Oct. 19, 1937 |
| 2,254,455 | Sorenson | Sept. 2, 1941 |
| 2,315,036 | Bailly | Mar. 30, 1943 |
| 2,857,053 | Schmiedel | Oct. 21, 1958 |

Dedication 3,018,895.—*Ludwig Schmiedel*, Wunstorf-Hannover, Germany. DEVICE FOR FLOATING UP AND WASHING OUT OF GROUND PRODUCTS OR MATERIALS. Patent dated Jan. 30, 1962. Dedication filed June 25, 1975, by the assignee, *Starcosa GmbH*.

Hereby dedicates to the Public the remaining term of said patent.

[*Official Gazette March 9, 1976.*]